M. CHANDLER.
Horse-Hoe.
No. 211,701. Patented Jan. 28, 1879.
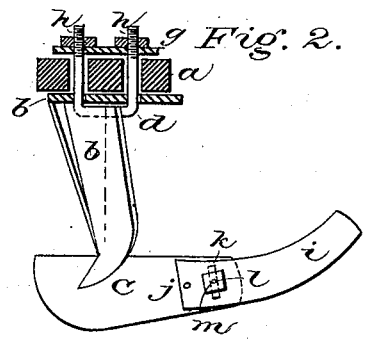
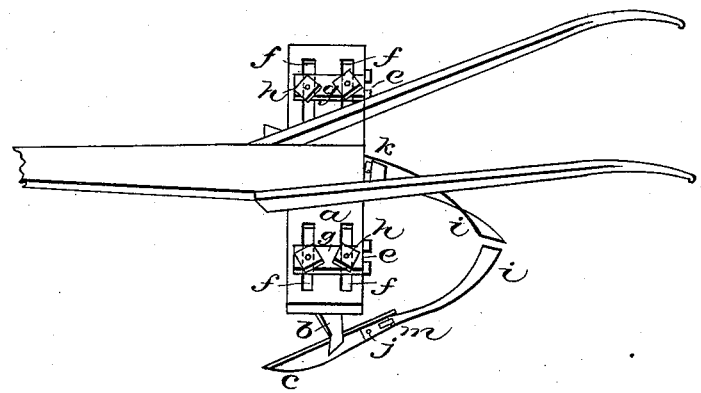
Witnesses:
John R. Mason
E. D. Patten
Inventor:
Moses Chandler
by Wm Macklin Leavy, Atty

UNITED STATES PATENT OFFICE.

MOSES CHANDLER, OF EAST CORINTH, MAINE, ASSIGNOR TO JOHN G. MAYO AND JOSIAH B. MAYO.

IMPROVEMENT IN HORSE-HOES.

Specification forming part of Letters Patent No. 211,701, dated January 28, 1879; application filed August 30, 1878.

*To all whom it may concern:*

Be it known that I, MOSES CHANDLER, of East Corinth, in the county of Penobscot and State of Maine, have invented certain new and useful Improvements in Horse-Hoes; and I do hereby declare that the following is a full, clear, and exact description thereof, that will enable others skilled in the art to which they appertain to make and use the same, reference being had to the accompanying drawings, forming a part of this specification, in which—

Figure 1 is a perspective view of my hoe; Fig. 2, detail of standard and wing; Fig. 3, plan of top of standard; Fig. 4, rear elevation of standard; Fig. 5, detail of wing.

Same letters show like parts.

My improvements relate to horse-hoes; and consist in devices for securing the standards carrying the hoe-blades to the frame, whereby they are readily adjustable.

My hoe is provided with adjustable wings of spring metal, having an inward twist, and operating to throw the fresh earth inward toward the roots of the plants, turning it at the same time.

Referring to the drawings, $a$ shows the cross-bar of the frame, carrying upon its ends the standards $b$, supporting the hoe-blades $c$. These standards are secured to the cross-bar by a yoke, $d$, passing through notches $e$ and a slot, $e'$, in the upper part of the standard, and upward through longitudinal slots $ff$ in the cross-bar.

A plate, $g$, may, if desired, be placed over the ends of the yoke, which is held firmly in place by nuts $h\ h$.

When it is desired to vary the angle of the blades the nuts are loosened and the standards turned, the yoke moving in the slots $ff$ until in the desired position.

To the rear ends of the hoe-blades are secured wings $i$, pivoted upon a bolt, $j$.

The blade is provided with a vertical slot, $k$, through which a bolt, $l$, passes into the wing, having a nut upon one end, whereby the wing may be adjusted vertically.

The adjustment is effected by raising or lowering the outer extremity of the wing, moving on the bolt or pivot $j$, the bolt $l$ traveling in the slot, and being held in the proper position by turning up the nut $m$.

The form of the wing is shown in Fig. 5, and is, as stated, for the purpose of throwing the earth inward toward the plants as the hoe passes over the hills or rows.

What I claim as my invention, and desire to secure by Letters Patent, is—

In a horse-hoe, the combination of the cross-bar $a$, having slots $ff$, standard $b$, having slot $e'$ and notches $e$, yoke $d$, and nuts $h\ h$, substantially as set forth, for the described purposes.

In testimony that I claim the foregoing I have hereunto set my hand this 13th day of August, 1878.

MOSES CHANDLER.

Witnesses:
WM. C. MASON,
WM. FRANKLIN SEAVEY.